3,228,744
NOVEL POLYPROPYLENE POLYMERS AND PROCESS FOR PREPARING THE SAME

William S. Karn, Darien, Conn., assignor to American Cyanamid Company, New York, N.Y., a corporation of Maine
No Drawing. Filed June 21, 1960, Ser. No. 37,552
3 Claims. (Cl. 8—115.5)

The present invention relates to novel preformed polypropylene fibers. More particularly, it relates to novel preformed dyeable polypropylene fibers and methods for preparing same. Still more particularly, it is concerned with a chlorosulfonated preformed polypropylene fiber prepared by irradiating preformed polypropylene fiber in the absence of either solvent or a suspending liquid and in the presence of a mixture of chlorine and sulfur dioxide gases.

Polypropylene fiber of high average molecular weights in the range of from about 100,000 to about 500,000 cannot be dyed to any desired color. However, such fibers have been dyed in the past but no method has been entirely satisfactory. A most widely accepted method has been to add dyestuff to a polymer melt prior to spinning to obtain a polypropylene fiber. This method presents several serious shortcomings. It becomes necessary to fix a dyestuff in the fiber at the time of the latter's manufacture. To so implant or fix a dyestuff is poor practice, since the weaver or purchaser of the fiber has no opportunity to vary its color or shade. It is highly desirable to permit the weaver to dye the fiber to satisfy the needs and desires of his purchasers. To avoid this shortcoming, another method has been proposed to dye polypropylene which had been previously subjected to chlorosulfonation. This is accomplished by suspending polypropylene polymer in carbon tetrachloride and then subjecting the mixture to chlorosulfonation employing sulfur dioxide and chlorine gases. The thus-chlorosulfonated polypropylene in solution is next melt spun at about 250° C. Chlorosulfonated polypropylene fiber is obtained. Unfortunately, the fiber is highly degraded and discolored and, though dyeable only with dark colors, could not be satisfactorily used because true dye shades could not be obtained. In view of the increased demand for polypropylene fiber it would be desirable to provide a preformed dyeable polypropylene fiber (of good tensile strength) which is not discolored utilizing an economically feasible method to obtain such fiber.

It is, therefore, a principal object of the present invention to provide a preformed, non-discolored, dyeable polypropylene fiber of good tensile strength. It is further object to provide a novel method for obtaining a preformed, non-discolored, dyeable polypropylene fiber of good tensile strength. It is a still further object to provide a non-discolored, dyed polypropylene fiber of good tensile strength. Other objects will be apparent to those skilled in the art from a consideration of the ensuing description.

To this end, a non-discolored, dyeable preformed polypropylene fiber of high tensile strength is provided utilizing a straightforward method. In its broadest aspects, the method involves irradiating preformed polypropylene fiber while chlorosulfonating the latter in the solid state. The treatment contemplates the introduction of sulfur and chlorine in an amount sufficient to obtain the requisite chlorosulfonyl content in the polymer molecule. Dyeing of the fiber will readily occur.

According to the process of the invention, preformed polypropylene fiber is irradiated in the presence of a mixture of sulfur dioxide and chlorine. Surprisingly, it has been found that for optimum operation, the polypropylene can be prepared by being initially saturated with sulfur dioxide and chlorine for several minutes, then irradiated, and thereafter held in an atmosphere of the aforementioned reactive gases to allow completion of the radiation-induced reaction.

The preformed polypropylene fiber employed in the process of the present invention is a high molecular weight linear polymer in the weight range of from about 100,000 to about 500,000 and, preferably, from about 350,000 to about 450,000. The fiber employed herein is substantially colorless and is insoluble in most organic solvents.

It has been unexpectedly found that chlorosulfonation of the preformed polypropylene fiber occurs rapidly when saturated with a mixture of sulfur dioxide and chlorine gases prior to subjecting the fiber to irradiation. In the absence of irradiation, reaction does not take place. Although presaturation of the fiber with the aforementioned chlorosulfonating gas mixture is a preferred embodiment, it is found that gas presaturation is not required. Surprisingly, either gas saturation and irradiation can be carried out simultaneously or gas saturation may follow irradiation of the fiber. However, such treatments are not preferred processes, since the irradiation dosage required to effect a given degree of chlorosulfonation by the latter procedures is unduly high and, therefore, economically unattractive.

The radiation utilized in accordance with the process of the instant invention can be of several types. One type of radiation is particulate radiation, such as $\alpha$-particles and $\beta$-radiation (that is, electrons), obtained from radioactive nuclei or high-energy electrons from machine sources. Another type of radiation which falls within the purview of the invention is electromagnetic radiation, such as gamma rays, X-rays, ultraviolet light or visible light. However, a preferred source of radiation is a beam of high-energy electrons (e.g. from about 0.5–3 million electron-volt electrons). Such beams have been found to possess sufficient energy to penetrate from about 2.5 to 15 millimeters of solid polypropylene. In this manner most thicknesses of carded staple fiber, tow fiber or even woven fabric can be treated.

In general, it has been found that for ionizing radiation, a total dose of from 10,000 to 50,000,000 rads can be effectively tolerated. A rad is defined as equal to 100 ergs of actual energy absorbed per gram of material treated. Optimum results, however, are obtained when from 75,000 to 1,200,000 rads are absorbed to render good "hand" feel to the fiber as well as good dyeability with attendant little loss, if any, of mechanical strength.

Sufficient chlorine and sulfur dioxide gas mixture should be present to provide from about 0.1% to 5.0% sulfur and from 0.3% to 20% chlorine, and preferably from 1.5% to 2.5% sulfur and from 3.5% to 10% chlorine. It is observed that where the chlorosulfonated fiber contains greater than 5% sulfur and greater than 20% chlorine, the fiber is boardy and stiff. At less than 0.4% sulfur and 1.2% chlorine, dyeability becomes increasingly difficult and is, therefore, adversely affected.

Advantageously, the cholorsulfonating gases can be introduced at widely varying rates. Thus, chlorine and sulfur dioxide gases can each be introduced at from 0.1 to 10,000 parts per part of fiber per hour, all parts based on weight. A preferred rate for each gas is 1 to 50 parts parts of each gas per part of fiber per hour. In general, a mol ratio of sulfur dioxide to chlorine of from 1–50 to 50–1, respectively, can be used, although a preferred mol ratio of sulfur dioxide to chlorine is 1–10 to 3–1, respectively. In most instances, however, a mol ratio of from 1 to 1 is employed with attendant good results.

Since extremely short periods are required for delivering ionizing radiation in the form of high-energy electrons, this is the preferred embodiment. It has been found that a time in the range of from 0.06 to 0.6 second is sufficient. However, longer periods are required for other types of radiation. Thus, for instance, some ten to fifteen minutes are usually required where X-rays are used, and even longer times, from about 20 to 60 minutes, are required for irradiation where utilizing visible light. When so operating, varying temperatures to effect the chlorosulfonation reaction may be employed. Temperatures in the range of from about 20° C. to 100° C. are contemplated.

Chlorosulfonation is generally carried out under atmospheric pressure. If desired, the reaction can be carried out either under superatmospheric pressure to accelerate the reaction, or under subatmospheric pressure. Where the total pressure of the reactive gases is greater than atmospheric, it appears desirable to introduce an inert gas such as nitrogen, helium or carbon dioxide, to assist in controlling the over-all reaction temperature.

In accordance with the process of the invention, it is a good practice, as stated above, that the preformed fiber to be treated be adequately saturated prior to irradiation with sulfur dioxide and chlorine at the particular pressure used. Thus, two to five minutes or more are required for presaturation at room temperature for a three denier fiber, although longer times are required for thicker fibers. When irradiation is complete, it is a preferred practice to maintain an atmosphere of the reactive gases for from 4–8 minutes or longer to permit completion of the radiation-induced reaction. This technique is particularly advantageous when high-energy electrons are employed to deliver the required radiation dose in a fraction of a second.

The so-chlorosulfonated preformed polypropylene fibers are free from discoloration, of good dyeability and of high tensile strength in the range of from 1 to 7 grams per denier. Among the dyes that can be used are Sevron Brilliant Red, Calcozine Acrylic Violet 3R, Sevron Blue 5G, Genacryl Blue 5B, Sevron Yellow R as well as any basic dye.

For a clearer understanding of the invention, the following examples are presented for purposes of illustration. They are not intended to be construed as being limitative. Unless otherwise specified, the parts given are by weight.

*Example 1*

Five parts of three denier polypropylene fiber having a tensile strength of 3.7 grams per denier is placed in a suitable glass reactor equipped with inlet and outlet ports. A mixture of sulfur dioxide and chlorine is passed through the inlet port of the reactor at a rate equal to 128 parts of sulfur dioxide and 142 parts of chlorine per hour. After five minutes and with continued gas flow, the reactor is exposed to a beam of 3 million electron-volt-peak X-rays from a Van de Graaff accelerator for a period of ten minutes during which time a dose of 300,000 rads of ionizing radiation is imparted to the fiber. Gas flow into the reactor is continued for about five minutes after exposure of the fiber to the radiation. Nitrogen gas is next employed to sweep out residual gases from the reactor.

On analysis, the chlorosulfonated fiber contains 2% sulfur and 10% chlorine. It has a tensile strength of 2.6 grams per denier.

The fiber is easily dyed to a deep cherry red color in the following manner. The treated fiber is immersed for one minute in a boiling 0.1% solution of Basic Red No. 14 (Sevron Brilliant Red) containing 2.6% sodium acetate, and then washed for 30 seconds in boiling water to remove loosely held dye.

In a similar dyeing procedure, the untreated polypropylene fiber remains colorless.

*Example 2*

Five parts of a three denier polypropylene fiber having a tensile strength of 3.7 grams per denier is placed in a glass reactor suitably equipped with inlet and outlet ports. A mixture of sulfur dioxide and chlorine gases is passed through the reactor at the rate of 128 parts of sulfur dioxide and 142 parts of chlorine per hour. After five minutes and with continued gas flow the reactor is passed on a conveyor belt at a rate of 240 inches per minute under a beam of three million electron-volt electrons. The total dose received by the reaction mixture is about 300,000 rads. The ionizing radiation is then discontinued but the gas flow is continued for five minutes. After removal of residual gas, the fiber is analyzed for sulfur and chlorine. The material contains 1.8% sulfur and 9.2% chlorine. The so-chlorosulfonated fiber is readily dyed to a deep red by following the procedure of Example 1 in every detail.

*Example 3*

A sample of polypropylene yarn spun from three denier staple is placed in a flat circular reaction vessel equipped with an inlet and an outlet port in such a way that no more than two thicknesses of yarn existed at any place. The vessel is covered with one mil thick polyethylene terephthalate film and located so that the sample is five inches from a General Electric AH–2 mercury vapor arc. After one minute of exposure to a flowing equimolar gas mixture of sulfur dioxide and chlorine, the lamp is turned on. After twelve minutes of irradiation and continued exposure to gas mixture, the fiber is colorless, contains 1.5% sulfur and 4.3% chlorine, and is dyed a deep red according to the dyeing procedure of Example 1.

Untreated polypropylene yarn could not be so dyed.

*Example 4*

One part of three denier polypropylene staple fiber is placed in a flat circular reaction vessel about one-half inch high and five inches in diameter, covered with one mil thick polyethylene terephthalate film and five inches from a 150 watt Mazda light bulb. After two minutes of exposure to a flowing equimolar gas mixture of sulfur dioxide and chlorine, the lamp is turned on. Twenty-three minutes later, the light is turned off and the fiber freed of residual gas. The chlorosulfonated fiber is colorless and contains 1.1% sulfur and 3.7% chlorine. However, when dyed according to the procedure of Example 1, the so-treated fiber accepted dye well and became moderately deep red in coloration.

In each of the above examples chlorosulfonation has been induced by means of either electromagnetic or particulate radiation. However, it is also within the purview of this invention to induce chlorosulfonation of polypropylene fiber by the utilization of an electric discharge. Any commercially available means for inducing an electric discharge may be employed in accordance with the practice herein.

The following example is presented to illustrate the use of electric discharge to effect chlorosulfonation of a preformed polypropylene fiber in the absence of any liquid environment.

*Example 5*

One part of polypropylene fiber in tow form is placed in a suitable glass tube eighteen inches long and 0.5 inch in diameter and containing eighteen gauge copper wire inside which runs its entire length. The glass tube apparatus has eight small holes positioned in a row spaced one and one-half inches apart. The tube is concentric with a one-inch diameter copper tube which acts as the second electrode. A gas mixture flowing at the rate of 18 parts of sulfur dioxide and 20 parts of chlorine per part of fiber per hour is introduced through a hole in the copper tube and flows through the holes in the glass tube over the fiber and out the ends of the glass tube. The copper wire and tube are attached to the terminals of a Model "T" Ford spark coil which is supplied by a 10 volt, 3 ampere filament transformer. After two minutes of gas flow, the current is turned on with concomitant continued gas flow. Some fifteen minutes later, the current is turned off and fiber tested for dyeability as in Example 1. A moderately deep red is obtained, indicating good dyeability of the chlorosulfonated fiber. On analysis, the chlorosulfonated fiber contains 1.2% sulfur and 4.7% chlorine.

I claim:
1. As a novel fiber, a chlorosulfonated, substantially colorless, preformed polypropylene fiber capable of being dyed and possessing good tensile strength, said novel fiber being prepared by the particulate or electromagnetic radiation of a preformed polypropylene fiber in the presence of a mixture of sulfuric dioxide and chlorine gases, whereby said fiber is chlorosulfonated to impart thereto a sulfur content from about 0.1% to about 5% and a chlorine content from about 0.3% to about 20%, all on a weight basis.

2. As a novel fiber, a chlorosulfonated, substantially colorless, preformed polypropylene fiber, said fiber possessing good tensile strength and capable of being dyed, said novel fiber being prepared by the particulate or electromagnetic radiation of a preformed polypropylene fiber in the presence of a mixture of sulfuric dioxide and chlorine gases, whereby said fiber is chlorosulfonated to impart thereto a sulfur content from about 1.5% to about 2.5% and a chlorine content from about 3.5% to about 10%, all on a weight basis.

3. The novel fiber according to claim 2 in which the average molecular weight falls within the range of from about 100,000 to about 500,000.

References Cited by the Examiner
UNITED STATES PATENTS

| | | | |
|---|---|---|---|
| 2,170,439 | 8/1939 | Wiezevich | 28—82 |
| 2,223,376 | 12/1940 | Malm | 28—82 |
| 2,400,720 | 5/1946 | Staudinger et al. | 260—79.3 |
| 2,534,078 | 12/1950 | Strain | 260—79.3 |
| 2,597,557 | 5/1952 | Amborski | 8—115.5 |
| 2,636,804 | 4/1953 | McClellan et al. | 8—115.5 |
| 2,889,259 | 6/1959 | Noeske et al. | 204—162.5 |
| 2,920,062 | 1/1960 | McFarland | 260—79.3 |
| 2,974,094 | 3/1961 | Black | 204—162.5 |

JOSEPH L. SCHOFER, *Primary Examiner.*

RUSSELL C. MADER, JOSEPH R. LIBERMAN, JAMES A. SEIDLECK, *Examiners.*

J. B. MAIER, J. F. McNALLY, *Assistant Examiners.*